(12) United States Patent
Notté et al.

(10) Patent No.: US 8,728,427 B2
(45) Date of Patent: May 20, 2014

(54) METHOD FOR THE MANUFACTURE OF CONCENTRATED PHOSPHORUS ACID

(75) Inventors: Patrick Notté, Wavre (BE); Albert Devaux, Mont-Saint-Guibert (BE)

(73) Assignee: Straitmark Holding AG, Zug (CH)

( * ) Notice: Subject to any disclaimer, the term of this patent is extended or adjusted under 35 U.S.C. 154(b) by 546 days.

(21) Appl. No.: 12/989,329

(22) PCT Filed: Apr. 24, 2009

(86) PCT No.: PCT/EP2009/054998
§ 371 (c)(1),
(2), (4) Date: Dec. 8, 2010

(87) PCT Pub. No.: WO2009/130321
PCT Pub. Date: Oct. 29, 2009

(65) Prior Publication Data
US 2011/0085959 A1  Apr. 14, 2011

(30) Foreign Application Priority Data

Apr. 25, 2008  (EP) .................................... 08155197

(51) Int. Cl.
*C01B 25/16* (2006.01)
(52) U.S. Cl.
USPC ........................................................ 423/316

(58) Field of Classification Search
USPC .......................................................... 423/316
See application file for complete search history.

(56) References Cited

U.S. PATENT DOCUMENTS 3,528,772 A * 9/1970 Whyte et al. .................. 423/318
3,532,361 A * 10/1970 Hrynik .......................... 297/481

FOREIGN PATENT DOCUMENTS

| DE | 292637 | 8/1990 |
| DE | 292639 | 8/1991 |
| GB | 1264275 | 2/1972 |
| JP | 01167203 A * | 6/1989 |

* cited by examiner

*Primary Examiner* — Emily Le
*Assistant Examiner* — Jenny Wu
(74) *Attorney, Agent, or Firm* — Samuel Digirolamo; Husch Blackwell LLP

(57) ABSTRACT

A method for the manufacture of concentrated phosphorous acid starting from pure $P_4O_6$ is disclosed. The $P_4O_6$ is hydrolyzed, preferably under stirring in water in the presence of a homogeneous Broensted acid catalyst while maintaining in the hydrolysis/reaction medium a pH below 5 whereby the free water level, at the completion of the hydrolysis, is in the range from 0 to 40%.

12 Claims, No Drawings

METHOD FOR THE MANUFACTURE OF CONCENTRATED PHOSPHORUS ACID

CROSS REFERENCE TO RELATED APPLICATIONS

This application is a U.S. National Phase Application of International Application PCT Application No. PCT/EP2009/054998, filed on Apr. 24, 2009, which claims the benefit of priority from European Patent Application No. 08155197.0, filed on Apr. 25, 2008. The disclosures of International Application PCT Application No. PCT/EP2009/0544998 and European Application 08155197.0 are incorporated herein by reference.

This invention concerns a once-through method for the manufacture of concentrated phosphorous acid starting from substantially pure tetra phosphorus hexa oxide. The $P_4O_6$ is hydrolysed in presence of a homogeneous Broensted acid, while maintaining a pH below 5 in the reaction medium, and water to thus yield from 0-40% free water in the final reaction mixture.

The phosphorous acid manufacturing technology, starting from $P_4O_6$, is well established and the art is crowded accordingly. While multiple manufacturing approaches have been advocated, such known processes tend to be deficient because of $P_4O_6$ hydrolysis originating, inter alia, from difficultly controllable reaction conditions and because of unacceptable impurities/by-products levels. While the $P_4O_6$ hydrolysis can be subject to an explosive reaction, a re-circulatory processing arrangement can allegedly reduce this inconvenience frequently at the expense of compound purity and selectivity contrary to standing desires and objectives.

The $P_4O_6$ technology, broadly, has been around for a long time and substantial efforts have been invested for exploiting the technology. As an example the preparation of phosphorous acid by hydrolysing $P_4O_6$ was known to be difficult, among others because $P_4O_6$ exhibits hydrophobic properties. At ambient temperature, the hydrolysis proceeds slowly and can give rise to explosion difficulties. While higher temperatures generally favour the hydrolysis, such temperatures also favour the formation of undesirable by-products inclusive of phosphine and phosphoric acid. The use of solvents can lead to a somehow better controllable hydrolysis although such technology is economically of little significance.

However, quite in general, $P_4O_6$ is not available commercially and has not found commercial application. The actual technology used for the manufacture of phosphorous acid is based on the $PCl_3$ hydrolysis with its well known deficiencies ranging from the presence of hydrochloric acid, losses of $PCl_3$ due to volatility and entrainment by HCl. In addition, the control of the reaction temperature is critical to limit $PCl_3$ losses (bp. 76° C.) and avoid LOOPS(*) formation. While the $PCl_3$ hydrolysis is used commercially, the $P_4O_6$ hydrolysis in accordance with the invention herein is not subject to the multiple shortcomings attached to the $PCl_3$ hydrolysis.

(*). "LOOPS" stands for lower oxides of phosphorus which are compositionally close to elemental phosphorus but will contain some oxygen. A polymeric composition approaching $(P_4OH)_n$ has been sometimes suggested.

DD 206 363 discloses a process for converting $P_4O_6$ with water into phosphorous acid in the presence of a charcoal catalyst. The charcoal can serve, inter alia, for separating impurities, particularly non-reacted elemental phosphorus. DD 292 214 also pertains to a process for preparing phosphorous acid. The process, in essence, embodies the preparation of phosphorous acid by reacting elemental phosphorus, an oxidant gas and water followed by submitting the reaction mixture to two hydrolysing steps namely for a starter at molar proportions of $P_4$:$H_2O$ of 1:10-50 at a temperature of preferably 1600-2000° K followed by completing the hydrolysis reaction at a temperature of 283-343° K in the presence of a minimal amount of added water.

DOS 3238910 concerns a method for preparing hydroxyalkane phosphonic acids by reacting an aldehyde carrying an alkyl, aryl or alkylaryl $C_{1-18}$ moiety with $P_4O_6$.

P-O compounds and the hydrolysis thereof are extensively described in the literature. Canadian patent application 2.070.949 divulges a method for the manufacture of phosphorous acid, or the corresponding $P_2O_3$ oxide, by introducing gaseous phosphorus and steam water into a gas plasma reaction zone at a temperature in the range of 1500° K to 2500° K to thus effect conversion to $P_2O_3$ followed by rapidly quenching the phosphorus oxides at a temperature above 1500° K with water to a temperature below 1100° K to thus yield $H_3PO_3$ of good purity. In another approach, phosphorus (I) and (III) oxides can be prepared by catalytic reduction of phosphorus(V) oxides as described in U.S. Pat. No. 6,440,380. The oxides can be hydrolyzed to thus yield phosphorous acid. EP-A-1.008.552 discloses a process for the preparation of phosphorous acid by oxidizing elemental phosphorus in the presence of an alcohol to yield P(III) and P(V) esters followed by selective hydrolysis of the phosphite ester into phosphorous acid. WO 99/43612 describes a catalytic process for the preparation of P(III) oxyacids in high selectivity. The catalytic oxidation of elemental phosphorus to phosphorous oxidation levels is also known from U.S. Pat. Nos. 6,476,256 and 6,238,637.

DD 292639 discloses a continuous process for the manufacture of phosphorous acid starting from the $P_4$ oxidation product, adding at a preferred temperature from 1300-1700° K, water or diluted phosphorous acid and recovering the phosphorous acid formed. The addition of water or diluted phosphorous acid, in combination with an inert gas, serves for improving the quenching and hydrolysis of the P-oxides. The reaction is said to be beneficial in suppressing undesirable dismutation of $H_3PO_3$ in phosphine and phosphoric acid occurring at temperatures above 420° K. The reaction of $P_4O_6$ with monocarboxylic acids is exothermic and yields a variety of acylphosphonic acids, in particular alkane hydroxy diphosphonic acids and carboxylic acid anhydrides. The reaction of $P_4O_6$ with acetic acid leads to mono- and diacetyl phosphonates. Such phosphonates, even upon dissolution in acetic acid, can become explosive at temperatures above 0° C. The reaction of $P_4O_6$ with formic acid can lead to substances which are explosive at temperatures above −30° C. (D. Heinz, Pure Appld. Chem., vol. 44, No. 2 (1975)).

The art manufacturing of phosphorous acid generally requires, starting from $P_4$, an $H_3PO_3$ isolation with its inherent deficiencies, including marginal selectivity and yield, a significantly shortened and more efficient processing sequence. As an example of the $P_2O_3$ reactivity, it is slowly oxidized to phosphorus pentoxide by air at room temperature and spontaneously ignites on heating to 70° C. When dissolved in cold water with vigorous agitation, a dilute solution of $H_3PO_3$ is formed. In hot water, the $P_2O_3$ reaction becomes violent forming phosphine, phosphoric acid and red phosphorus (Ullmann's Encyclopedia of Industrial Chemistry, 2002, Wiley-VCH Verlag GmbH).

It is a major object of this invention to manufacture a highly concentrated and pure phosphorous acid starting from pure tetra-phosphorus hexa-oxide. It is another object of this invention to provide a simplified once-through manufacturing arrangement for making concentrated phosphorous acid. Still another object of this invention aims at the manufacture of concentrated phosphorous acid containing reduced and stable levels of impurities/by-products. Yet another object of this invention aims at converting pure $P_4O_6$ into a concentrated phosphorous acid having a high degree of purity. Still another object of this invention relates to providing a P-oxide hydrolysis exclusive of known and undesirable safety hazard. The above and other objects can now be met by a manufacturing arrangement wherein a pure $P_4O_6$ product is converted, in a regulated manner, to phosphorous acid.

The term "percent" or "%" as used throughout this application stands, unless defined differently, for "percent by weight" or "% by weight". The term "ppm" stands for "parts per million". The terms "$P_2O_3$" and "$P_4O_6$" can be used interchangeably. Unless defined differently, pH values are measured at 25° C. on the reaction medium as such.

The invention herein basically amounts to a once-through/non-re-circulatory method for the manufacture of concentrated phosphorous acid by mixing pure $P_4O_6$ and reactants i.e. water and a homogeneous Broensted acid while maintaining in the hydrolysis mixture a pH below 5 whereby, at the end of the $P_4O_6$ hydrolysis, free water is present in an amount of from 0 to 40%, expressed in relation to the final hydrolysis mixture. In preferred executions, the $P_4O_6$ is added, under stirring, to the reaction medium containing water and the homogeneous Broensted acid. In another preferred execution, the concentrated phosphorous acid is recovered.

The $P_4O_6$ is represented by a substantially pure compound containing at least 85%, preferably more than 90%, more preferably at least 95% and in one particular execution at least 97% of the $P_4O_6$. While tetraphosphorus hexa oxide, suitable for use within the context of this invention, can be manufactured by any known technology, in preferred executions the hexa oxide can be prepared in accordance with the process disclosed in PCT/EP2008/066396 entitled "Process for the manufacture of $P_4O_6$". In detail, oxygen, or a mixture of oxygen and an inert gas, and gaseous or liquid phosphorus are reacted in essentially stoichiometric amounts in a reaction unit at a temperature in the range from 1600 to 2000° K by removing the heat created by the exothermic reaction of phosphorus and oxygen while maintaining a preferred residence time of from 0.5 to 60 seconds followed by quenching the reaction product to a temperature below 700° K. The hexaoxide so prepared is a pure product containing usually at least 97%, preferably at least 99% of the $P_4O_6$. The preferred residence time is from 5 to 30 seconds, more preferably from 8 to 30 seconds. The reaction product can, in one preferred execution, be quenched to a temperature below 350° K The term "concentrated" in "concentrated phosphorous acid" means that the reaction product formed is almost quantatively represented by phosphorous acid i.c. a major by-product can be represented by phosphoric acid in a level of 4% or less, expressed in relation to the sum of phosphorous acid and phosphoric acid, preferably 2% or less, in particular 1% or less. The level of impurities other than phosphoric acid will obviously vary depending upon the technology used for the manufacture of $P_4O_6$. In a preferred manufacturing approach, as e.g. in accordance with EP 07 121 760.8, the non-phosphoric acid by-products are generally present in a level of equal to or less than 3%, usually less than 2%, preferably less than 1%, expressed in reference to the $P_4O_6$ product (100%) to be used in the hydrolysis reaction, the $P_4O_6$ containing unreacted phosphorus and other P-oxides as impurities, mostly $P_4$. The like elemental phosphorus/by-products are generally separated by well-known technologies. As an example, elemental phosphorus is insoluble in concentrated phosphorous acid and can easily be separated by filtration.

The $P_4O_6$ (mp. 23.8° C.; bp. 173° C.) in liquid form is added to the aqueous reaction medium containing a homogeneous Broensted acid such that the pH of the reaction medium is at all times maintained below 5, preferably below 4, in particular equal to or below 2. The $P_4O_6$ is added to the reaction mixture under stirring generally starting at ambient temperature.

The level of water present in the reaction medium, after the hydrolysis of $P_4O_6$ has been completed, is in the range of from 0 to 40%, preferably 0 to 30%, calculated on the reaction mixture (100%). This reaction mixture thus contains the $P_4O_6$ hydro lysate and the Broensted acid. The use of minimal levels of free water e.g. 0 to 20% constitutes one particularly preferred embodiment. The water levels can, of course, be selected, to yield and facilitate the formation of predetermined concentration ranges of the reaction product. The concentration of the reaction product, phosphorous acid, can be selectively modified, e.g. concentrated, by distillation of the free water. In this context, the reaction product can be converted, by cooling, into solid form by crystallization followed by filtration. The reaction product which is substantially free of water can routinely be converted into a solid form e.g. by flaking.

The hydrolysis is conducted at ambient temperature conditions (20° C.) up to about 150° C. While higher temperatures e.g. up to 200° C., or even higher, can be used such temperatures generally require the use of an autoclave or a continuous operation conducted under pressure. The temperature increase during the $P_4O_6$ addition can result from the exothermic hydrolysis reaction and was found to provide temperature conditions favourable to the reaction. The Broensted acid was found to favour the immediate, upon addition, hydrolysis of the $P_4O_6$ without undue accumulation of water insoluble $P_4O_6$ which is known to lead to unwanted dismutation products and also favours the reaction to proceed in the presence of stoichiometric levels of water, or with low excess (vs. stoichiometric requirements) of water at high, well above ambient, temperature conditions. The homogeneous Broensted acid confers, during the $P_4O_6$ hydrolysis, to the reaction medium a pH (ambient temperature e.g. 20° C.) which shall at all times be below 5, preferably below 4, in particular below 2.

The pH values of practically all homogeneous Broensted acid substances are known from the literature or can, if this were needed, be determined conveniently. Homogeneous catalysts are catalysts adapted to form a single liquid phase within the reaction medium under the reaction conditions. It is understood that catalysts which are insoluble or immiscible in the reaction medium, and thus non-homogeneous, at ambient conditions e.g. 20° C., can become miscible or soluble at e.g. the reaction temperature and thus qualify as "homogeneous".

The homogeneous nature of an acid catalyst can be ascertained routinely by e.g. visible inspection of precipitation or phase separation properties.

Examples of suitable species of the homogeneous Broensted acid for use herein can e.g. be represented by sulfuric acid, sulfurous acid, trifluoroacetic acid, trifluoromethane sulfonic acid, HCl, HBr, HI, methane sulfonic acid, oxalic acid, p-toluene sulfonic acid and naphthalene sulfonic acid. Mixtures of the acid catalyst species can also be used.

The homogeneous Broensted acid as used during the $P_4O_6$ hydrolysis can leave a residue within the final reaction product. Nevertheless, there are known techniques for recovering the acid catalyst from the reaction medium such as ion exchange, nanofiltration or electrodialysis which can be used to solve or mitigate the problems.

The foregoing process variables show that the reaction can be conducted by a variety of substantially complementary arrangements. The reaction can be conducted as a batch process by adding the $P_4O_6$ to the water containing the homogeneous Broensted acid catalyst in a (1) closed vessel under autogeneous pressure built up or (2) in the absence of pressure containment or (3) in a continuous manner, possibly under autogeneous pressure built up, whereby the phosphorous acid reaction product is withdrawn on a continuous basis. In the absence of pressure containment, the increase in the reaction temperature can generate reflux conditions. The continuous process arrangement can be conducted in an intensified manner. The reaction temperature is in the range of from 20° C. to 150° C., preferably in the range of from 70° C. to 150° C.

The method of manufacturing technology of this invention is illustrated by means of a series of examples as follows.

1. To 30 g of a diluted HCl aqueous solution at pH 1 are added 55 g (0.25 moles) of 99% pure $P_4O_6$ under stirring in about 45 minutes under nitrogen. During the tetraphosphorus hexaoxide addition the temperature increased up to 105° C. At the end of the hydrolysis reaction, excess water amounts to 11% w/w of the total reaction mixture. $^{31}P$ NMR analysis of the colorless liquid so obtained shows 99% of phosphorous acid and 0.8% of phosphoric acid.

2. To 30 g of a diluted HCl aqueous solution at pH 4 are added 55 g (0.25 moles) of 99% pure P4O6 under stirring in about 45 minutes under nitrogen. During the tetraphosphorus hexaoxide addition the temperature increased up to 117° C. At the end of the hydrolysis reaction, excess water amounts to 11% w/w of the total reaction mixture. $^{31}P$ NMR analysis of the colorless liquid so obtained shows 99% of phosphorous acid and 0.8% of phosphoric acid.

3. To 30 g of a diluted HCl aqueous solution at pH 5 are added 55 g (0.25 moles) of 99% pure $P_4O_6$ under stirring in about 45 minutes under nitrogen. During the tetraphosphorus hexaoxide addition the temperature increased up to 104° C. At the end of the hydrolysis reaction, excess water amounts to 11% w/w of the total reaction mixture. $^{31}P$ NMR analysis of the colorless liquid so obtained shows 99% of phosphorous acid and 0.8% of phosphoric acid.

These data show, contrary to prior art expectations, that the $P_4O_6$ hydrolysis in accordance with this invention proceeds smoothly, without delay, with high selectivity even with low excess of water at high e.g. 117° C. temperature. Based on the relevant art, it was accepted that because of the hydrophobicity of the $P_4O_6$, the hydrolysis could be delayed to thus yield an accumulation of unreacted products in the reactor and would generate dismutation products such as phosphine and phosphoric acid.

The invention claimed is:

1. A method for manufacture of a concentrated phosphorous acid by mixing pure $P_4O_6$ and a reaction medium containing water and a homogeneous Broensted acid, said reaction medium having a pH below 5 whereby, at the end of the $P_4O_6$ hydrolysis, free water is present in an amount of from 0 to 40%, expressed in relation to the final reaction mixture, wherein the homogeneous Broensted acid is selected from the group consisting of sulfuric acid, sulfurous acid, trifluoroacetic acid, trifluoromethane sulfonic acid, HCl, HBr, HI, methane sulfonic acid, oxalic acid, p-toluene sulfonic acid, naphthalene sulfonic acid and mixtures thereof.

2. The method in accordance with claim 1 wherein the concentrated phosphorous acid is recovered.

3. The method in accordance with claim 1 wherein the pure $P_4O_6$ is added, under stirring to the reaction medium.

4. The method in accordance with claim 1 wherein the free water is present in a level of from 0 to 30% by weight.

5. The method in accordance with claim 1 wherein the pH of the reaction medium is below 4.

6. The method in accordance with claim 1 wherein the pure $P_4O_6$ contains at least 97% by weight of $P_4O_6$.

7. The method in accordance with claim 1 wherein the pure $P_4O_6$ contains less than 1by weight of elemental phosphorus.

8. The method in accordance with claim 1 wherein the pH of the reaction medium is maintained below 2.

9. The method in accordance with claim 1 wherein the reaction is carried out at a temperature in the range of from 20° C. to 200° C. in a process by adding the $P_4O_6$ to the water containing the homogeneous Broensted acid, said process being selected from the group consisting of:
   (1) in a closed vessel batch arrangement under autogeneous pressure built up;
   (2) in a vessel batch arrangement in the absence of pressure containment; and
   (3) in a continuous process, possibly under autogeneous pressure built up, whereby the concentrated phosphorous acid is withdrawn on a continuous basis.

10. The method in accordance with claim 1 wherein the pure $P_4O_6$ is prepared by reacting gaseous or liquid phosphorus with oxygen or a mixture of oxygen and an inert gas, in essentially stoichiometric amounts, in a reactor at an average temperature in the range from 1600 K to 2000 K by removing the heat created by the exothermic reaction of phosphorus and oxygen with a residence time from 0.5 to 60 seconds followed by quenching the concentrated phosphorous acid to a temperature below about 700° K.

11. The method in accordance with claim 10 wherein the residence time is from 5 to 30 seconds.

12. The method in accordance with claim 11 wherein the concentrated phosphorous acid reaction product is quenched to a temperature below about 350° K and wherein the residence time is from 8 to 30 seconds.

* * * * *